United States Patent
Vazirani

[19]

[11] Patent Number: 6,049,655

[45] Date of Patent: Apr. 11, 2000

[54] DASHBOARD MOUNTED FAN APPARATUS WITH PIVOTALLY MOUNTED FANS

[76] Inventor: Naresh K. Vazirani, 30 Hawk Rd., Lawrenceville, N.J. 08648

[21] Appl. No.: 09/349,368

[22] Filed: Jul. 8, 1999

[51] Int. Cl.[7] .............................. F24H 3/00; B60H 1/22; B60S 1/54

[52] U.S. Cl. ......................... 392/366; 392/367; 219/202; 416/246; 415/129

[58] Field of Search .................. 392/366, 367, 392/383; 416/246, 148; 415/129; 219/202

[56] References Cited

U.S. PATENT DOCUMENTS

| | | | |
|---|---|---|---|
| 751,485 | 2/1904 | Eck | 416/246 |
| 1,547,875 | 7/1925 | Hutto | 416/246 |
| 1,636,358 | 7/1927 | Fairman et al. | 416/246 |
| 2,434,130 | 1/1948 | Turner | 416/246 |
| 4,261,255 | 4/1981 | Anderson et al. | 415/126 |
| 4,703,152 | 10/1987 | Shih-Chin | 392/366 |
| 4,874,921 | 10/1989 | Gerbig, Jr. | 219/202 |
| 4,916,287 | 4/1990 | Soden et al. | 219/202 |
| 5,373,580 | 12/1994 | Shao | 392/366 |
| 5,463,203 | 10/1995 | Moore | 219/202 |
| 5,667,710 | 9/1997 | Kraemer | 219/202 |
| 5,781,695 | 7/1998 | Summers et al. | 392/383 |
| 5,790,748 | 8/1998 | Tamhane | 392/366 |

FOREIGN PATENT DOCUMENTS

| | | | |
|---|---|---|---|
| 2535028 | 4/1984 | France | 392/383 |

*Primary Examiner*—John A. Jeffery
*Attorney, Agent, or Firm*—Henderson & Sturm LLP

[57] ABSTRACT

A fan apparatus 10 for use on the dashboard 101 of a vehicle 100 includes a housing member 20 having a fixed Louver element 22 for introducing ambient air into the interior of the housing member 20. The air will be heated by a heating coil member 30 and the heated air will be forced through at least one downwardly angled hinged Louver panel 25 by at least one fan member 40. Wherein, the angular orientation of the fan member 40 can be altered by the manipulation of an elongated stem element 43 which projects through an enlarged opening 26 in the housing member 20.

10 Claims, 1 Drawing Sheet

DASHBOARD MOUNTED FAN APPARATUS WITH PIVOTALLY MOUNTED FANS

BACKGROUND OF THE INVENTION

1. Field of the Invention

The present invention relates to the field of vehicle heater arrangements in general and in particular to an auxiliary heating device employing a dual independently mounted forced air system for the heating device.

2. Description of Related Art

As can be seen by reference to the following U.S. Pat. Nos. 5,781,695; 5,463,203; 5,667,710; 4,916,287; and 4,874,921, the prior art is replete with myriad and diverse permanent and portable car heating systems.

While all of the aforementioned prior art constructions are more than adequate for the basic purpose and function for which they have been specifically designed, they are uniformly deficient with respect to their failure to provide a simple, efficient, and practical auxiliary heating systems for the interior of a vehicle which employs a novel forced air circulating system to direct the heated air to selected locations.

As most vehicle owners are aware, the conventional method for directing forced air from either permanent or auxiliary climate control devices employs a system of pivoted louvers that will focus the forced air that is generated by one or more fixed fans within the climate control device. Unfortunately, the pivoted lever and/or dial system leaves a lot to be desired with respect to focusing the air flow due to the fact that it normally requires a series of adjustments to properly direct the air flow to an individual's personal preference.

As a consequence of the foregoing situation, there has existed a longstanding need for a new simplified approach to directing forced air from within a climate control device by employing a plurality of independently positionable fan members; and, the provision of such an arrangement is the stated objective of the present invention.

BRIEF SUMMARY OF THE INVENTION

Briefly stated, the dashboard mounted fan apparatus that forms the basis of the present invention comprises in general, a housing unit, a heating unit, and a novel forced air generating unit wherein the heating unit is completely disposed within the housing unit and a portion of the forced air generating unit projects outside of the housing unit to facilitate the focusing of the streams of forced air.

As will be explained in greater detail further on in the specification, the housing unit includes a housing member having an upper housing panel which is pivotally associated with a pair of downwardly angled Louver panels provided with enlarged central apertures.

In addition, the forced air generating unit includes a pair of fan members mounted in a swiveling fashion on the opposite ends of a support arm; wherein, each fan member is provided with an elongated stem element dimensioned to project through the enlarged central apertures in the Louver panels; wherein, the user may quickly and simply grasp the free end of the stem element to focus the air stream from one of the fan members through the housing member.

With this particular arrangement, it is not necessary for the user to verify the direction of the air flow by placing their hands in front of the fan exhaust and they do not even have to take their eyes off of the road due to the fact that they will be relying on their tactile senses as they position the elongated stem element to selectively swivel each fan member to the desired angular orientation.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
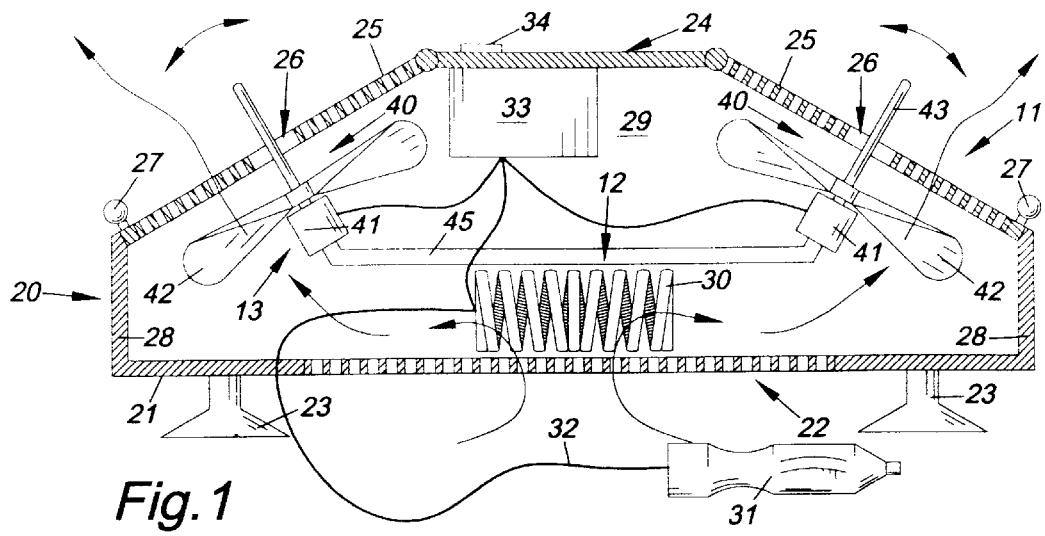
FIG. 1 is a cross-sectional view of the dashboard mounted fan apparatus that forms the basis of the present invention.

As can be seen by reference to the drawings, and in particular to FIG. 1, the dashboard mounted fan apparatus that forms the basis of the present invention is designated generally by the reference number 10. The apparatus 10 comprises in general a housing unit 11, a heating unit 12, and a forced air unit 13. These units will now be described in seriatim fashion.

Figure 5:
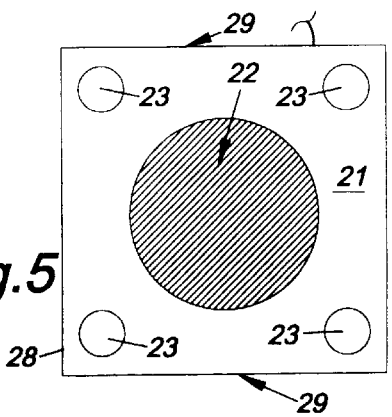
FIG. 5 is a bottom plan view of the housing unit.

As shown in FIGS. 1 and 5, the housing unit 11 comprises a housing member 20 having an elongated rectangular bottom panel 21 provided with a central fixed Louver element 22 surrounded by a plurality of suction cup support elements 23 for releasably securing the housing member 20 to a vehicle dashboard 101; wherein the support element 23 suspend the central Louver element 22 above the dashboard 101 to admit ambient air into the interior of the housing member 20 in a well-recognized fashion.

Figure 4:
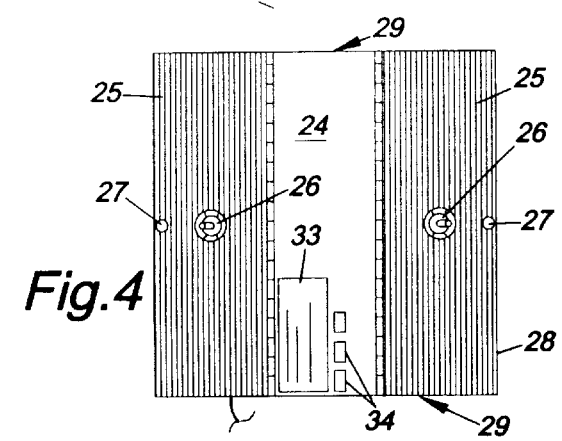
FIG. 4 is a top plan view of the housing unit.

Turning now to FIGS. 1 and 4, it can be seen that the housing member 20 also has an elevated upper panel 24 which is hingedly associated with a pair of downwardly angled Louver panels 25 having an enlarged central aperture 26 whose purpose and function will be described presently.

In addition, each of the angled Louver panels 25 are provided with a handle element 27 for raising and lowering the panels 25 to provide access into the interior of the housing member 20.

As can best be seen by reference to FIGS. 1 and 2, the heating unit 12 includes a heating coil member 30 which is connected by an electrical coupler 31 to the vehicle battery through the cigarette lighter outlet 102 via electrical wiring 32 which is further associated with a control box 33 whose purpose and function will be described in greater detail further on in the specification.

Figure 3:
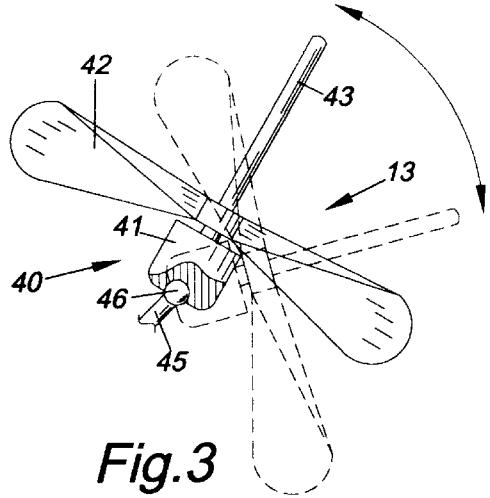
FIG. 3 is an isolated detail view of the mounting arrangement for each of the fan members.

As can be seen by reference to FIGS. 1 and 3, the forced air unit 13 comprises a pair of fan members 40 including a fan motor 41 mounted in a swiveling fashion on the outboard ends of a support arm element 45 mounted within the interior of the housing member 20; wherein, the fan motor 41 imparts a rotary motion to a fan blade assembly 42 rotatably mounted on an elongated axial stem element 43.

At this juncture, it should be noted that the orientation of each of the fan members 40 relative to the support arm element 45 and the associated Louver panel 25 may be varied by grasping the stem element 43 which projects through the enlarged opening 26 in the Louver panels 25 to pivot the fan motor 41 on the swivel head elements 46 on the ends of the support arm element 45 in a well recognized fashion.

Figure 2:
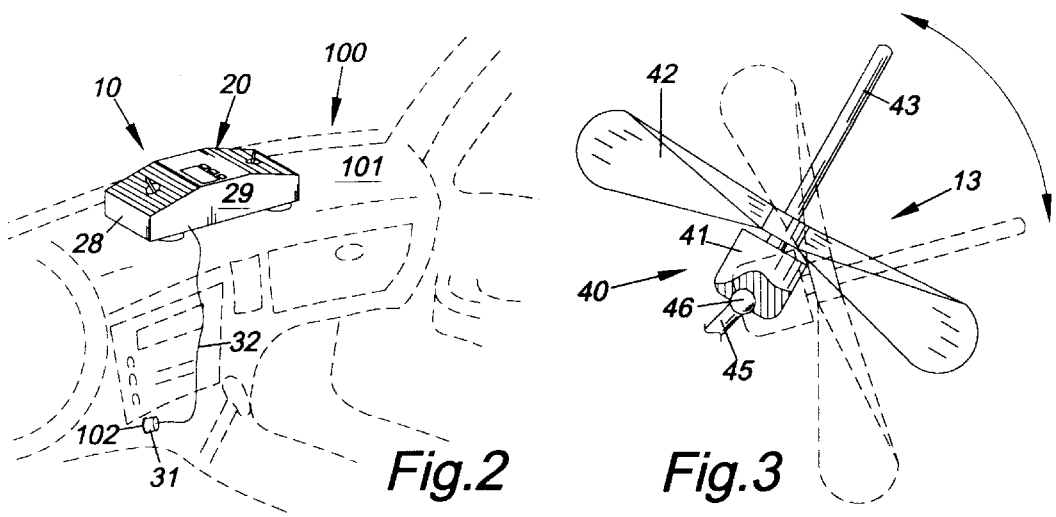
FIG. 2 is a perspective view of the apparatus mounted on a vehicle dashboard.

As shown in FIGS. 1 and 2, the Louver panels 25 on the housing member are disposed at an angle of approximately 30° relative to the upper panel 24 wherein the free ends of each hinged panel 25 rest on the opposed sidewalls 28 of the housing member 20; and, wherein the front and rear sidewalls 29 are connected to the upper panel 24 and contoured to accept the panels 25.

Turning now to FIG. 4, it can be seen that the control box 33 is provided with a plurality of control buttons 34 that can actuate both the beating coil member 30 and the fan members 40 in a well-recognized fashion to produce a desired climate within the interior of the vehicle 100 while the driver and/or passenger can manipulate the stem elements 43 to change the direction of the forced air generated by the fan members 40.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A dashboard mounted fan apparatus for use in a vehicle equipped with a dashboard and provided with an electrical outlet such as a cigarette lighter socket; wherein, the apparatus comprises:

a housing unit including: a housing member having a bottom panel; a plurality of raised sidewalls operatively connected to the bottom panel; an upper top panel operatively connected to a pair of opposed sidewalls; a fixed Louver element disposed in the bottom panel; and, at least one Louver panel hingedly connected to the upper panel;

a heating unit including a heating coil member disposed within the housing member; and, a forced air unit including at least one fan member pivotally disposed within the housing member proximate the at least one Louver panel and further provided with means for varying the angular position of the at least one fan member relative to the at least one Louver panel.

2. The apparatus as in claim 1; wherein, the at least one Louver panel is angled downwardly relative to the upper panel.

3. The apparatus as in claim 1; wherein, the bottom panel is provided with a plurality of suction cup support elements.

4. The apparatus as in claim 1; wherein, the heating coil member is provided with an electrical coupler adapted to be received in the vehicle electrical outlet.

5. The apparatus as in claim 1; wherein, the at least one Louver panel is provided with an enlarged opening.

6. The apparatus as in claim 5; wherein, the at least one fan member is provided with an elongated stem element that is dimensioned to extend through the enlarged opening in the at least one Louver panel.

7. The apparatus as in claim 1; wherein, the housing member is provided with a pair of Louver panels which are hingedly connected to said upper panel.

8. The apparatus as in claim 7; wherein, the forced air unit compresses a pair of fan members wherein each fan member is disposed proximate to one of the pair of Louver panels.

9. The apparatus as in claim 8; wherein, each of the pair of Louver panels are angled downwardly relative to said upper panel.

10. The apparatus as in claim 9; wherein, each of the pair of fan members are provided with means for varying the angular orientation of each fan member relative to the housing member.

* * * * *